Aug. 27, 1968  J. VLCEK ET AL  3,398,433
SHOE MOLDING PRESS

Filed July 8, 1965  3 Sheets-Sheet 1

INVENTORS
Josef Vlček, Bohuslav Fimberger,
Jiří Pavelka
BY
Richard Low
ag't

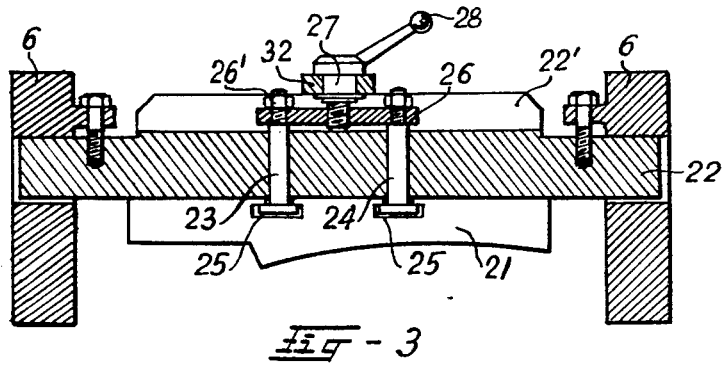
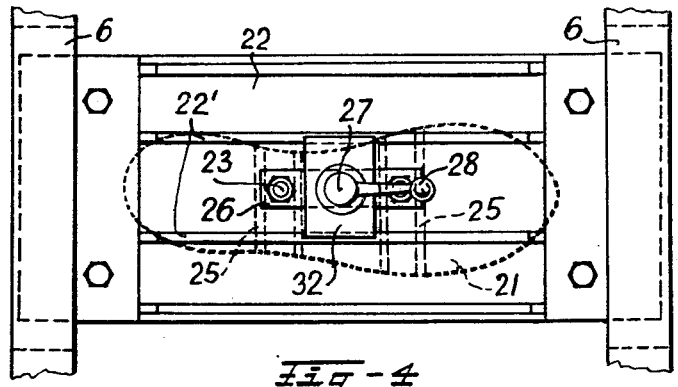
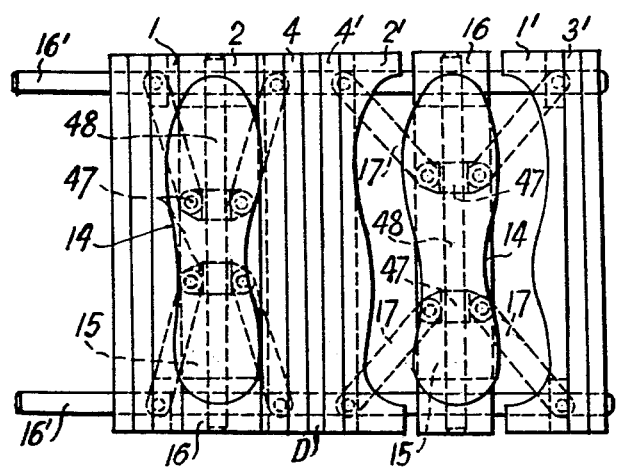

United States Patent Office 3,398,433
Patented Aug. 27, 1968

3,398,433
SHOE MOLDING PRESS
Josef Vlček, Bohuslav Fimbinger, and Jiri Pavelka, Gott-
waldov, Czechoslovakia, assignors to Zavody presneho
strojirenstvi Gottwaldov, narodni podnik, Gottwaldov,
Czechoslovakia
Filed July 8, 1965, Ser. No. 470,508
Claims priority, application Czechoslovakia,
July 9, 1964, 3,960/64
1 Claim. (Cl. 18—17)

ABSTRACT OF THE DISCLOSURE

A molding press for rubber boots in which the two parts of a shaft mold are moved horizontally toward each other against a core or last by a toggle linkage, and the sole part of the mold is simultaneously moved toward the core at right angles to the direction of the shaft mold movement while free to move in that direction, and is provided with a clamping arrangement for fixing the position of the sole part in the closed mold.

This invention relates to a shoe molding press, and particularly to a vulcanizing press for high rubber boots and the like.

It is known to manufacture rubber boots from a textile lining and from a rubber composition which is vulcanized on the lining, while the same is supported on a hollow last of resilient material. The lining carrying the uncured rubber composition is pulled over the last which is then enclosed in a heated mold. The pressure necessary for vulcanization is provided by compressed air admitted to the hollow last.

The primary object of this invention is the provision of an improved molding press for performing the basically known process.

A more specific object is the provision of a press which is less complex than corresponding equipment currently employed, and therefore less costly to build.

Another object is the provision of a press mold in which damage or deformation of the inflatable last during closing of the rigid mold parts is safely avoided. Particularly the sole or bottom portion of the inflatable last is subject to deformation during mold closing in conventional molding presses. Since the last constitutes a core in the mold, its deformation results in undesired variations in wall thickness of the vulcanized boot or shoe.

A further object of the invention is the prevention of injury to the sole part of the mold during mold closing and opening by the mold parts which constitute the shaft mold. The invention aims at providing a simple and sturdy linkage connecting the elements of the press for achieving the desired relative movement of the mold parts.

With these and other objects in view, the shoe molding press of the invention is provided with two bars or similar members which are mounted on the supporting press frame for movement toward and away from each other in a predetermined direction, the movement being actuated by a motor. The mold essentially consists of two parts which jointly constitute a shaft mold, a sole part, and a core part. The parts of the shaft mold are mounted on the frame for mold closing and opening movement relative to each other transversely of the direction of bar movement. The sole part is mounted on one of the bars, and the core part is mounted on the frame and is movable thereon in the direction of movement of the shaft mold. One of the shaft mold parts is connected to the bars by a hinged linkage in such a manner that the parts of the shaft mold approach each other when the bars move toward each other. The core part is connected to the two parts of the shaft mold by a centering mechanism which maintains a predetermined relationship between the respective spacings of the core part from the shaft mold parts during relative movement of the latter.

Other features and many of the attendant advantages of this invention will be readily appreciated as the same becomes better understood from the following description of a preferred embodiment when considered with the annexed drawings in which:

FIG. 3 shows a detail of the press in side-elevational section on the center line of the mold;

FIG. 4 shows the detail of FIG. 3 in top plan view; and

FIG. 5 is a top plan view of another detail of the press including the centering mechanism for the core part of the mold.

Figure 1:
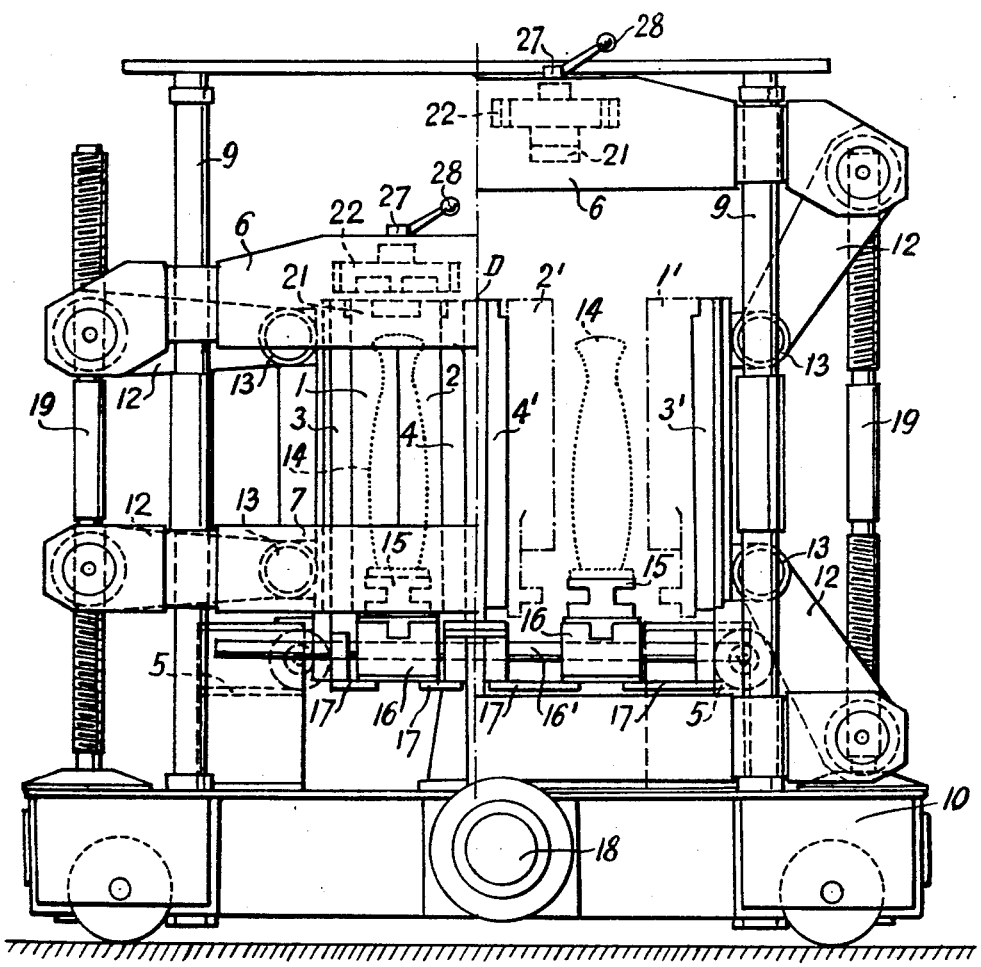
FIG. 1 shows a shoe molding press of the invention in fragmentary front elevation, the press being equipped with two molds, the portion of the press associated with one mold being illustrated in the closed mold position and the other portion in the open mold position, the releasable mold elements of said other press portion being indicated in phantom view.
Figure 2:
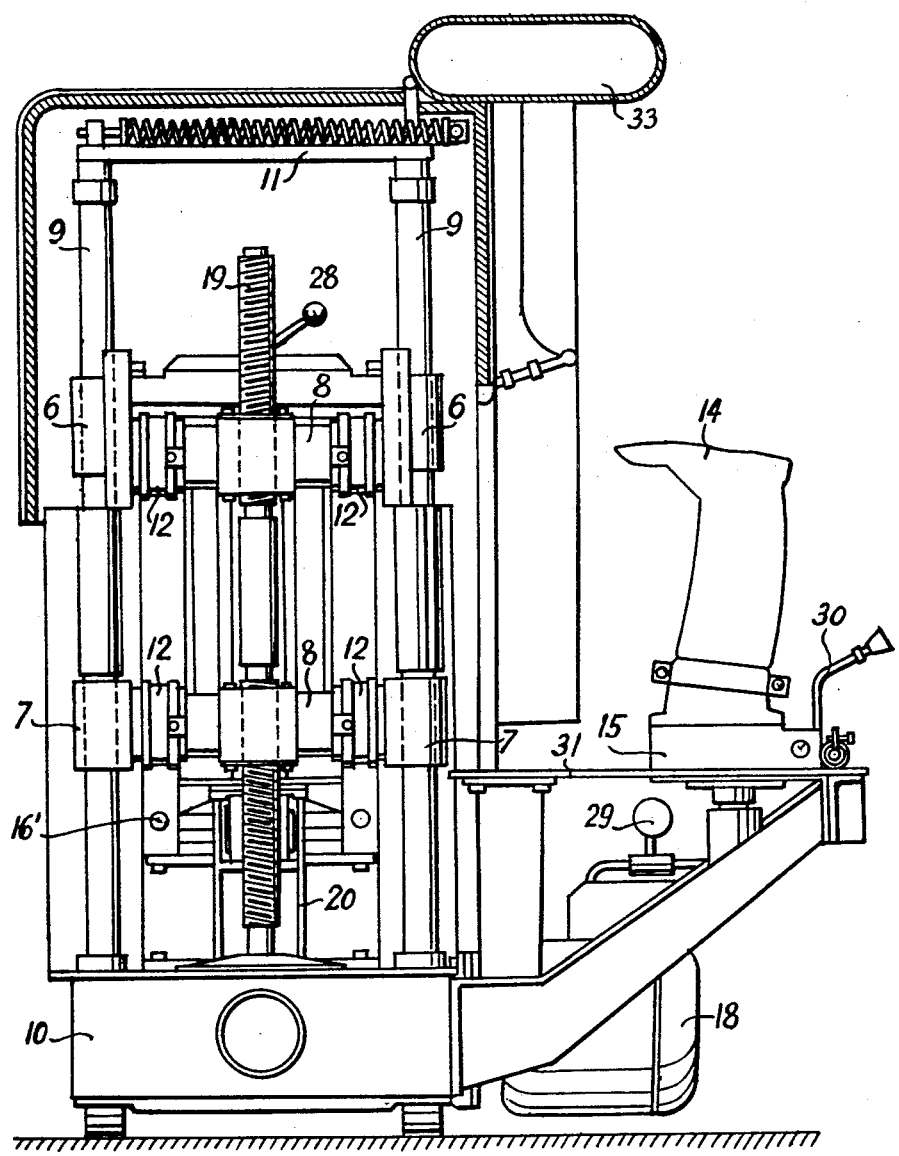
FIG. 2 shows the press of FIG. 1 in side elevation.

Referring now to the drawing, and initially to FIGS. 1 and 2, there is seen a machine frame mainly consisting of a heavy, wheeled casing 10 which is the machine base, four upright columns 9, and a top 11 which connects the columns. Two horizontal upper bars 6 are vertically slidable on respective pairs of columns 9 and their ends are transversely connected by two cross bars 8. Two lower horizontal bars 7 are similarly connected by two cross bars 8 and are slidably mounted on the columns 9.

Two upright spindles 19 are rotatably mounted on the casing 10 at the two sides of the machine and are connected by non-illustrated gearing in the casing to a common reversible electric motor 18. Upper and lower portions of each spindle are respectively provided with right-hand and left-hand threads which engage matingly threaded bores of cross bars 8. When the motor 18 rotates in one direction, the bars 6 and 7 move vertically toward each other in parallel alignment. When the motor 18 is reversed, the bars 6, 7 move apart.

An identical toggle arm or link 12 is associated with each end of the bars 6, 7. The four bars 12 on each side of the machine are pivoted in pairs on the corresponding cross bars 8, as best seen in FIG. 2, and are attached to hinges 13 on a corresponding movable, upright heating platen 3, 3' to which a shaft mold part 1, 1' may be releasably attached by a conventional dovetailed groove-and-tongue arrangement, not shown in detail. The platens 3, 3' travel horizontally on guide rails 5 when the bars 6, 7 are moved vertically by the motor 18.

The movable mold parts 1, 1' constitute respective shaft molds with fixed mold parts 2, 2' releasably attached to corresponding fixed, upright heated platens, 4, 4'. These platens are attached to the casing 10 by structural elements which include a beam 20 (FIG. 2).

Two cylindrical guide bars 16' are fixedly mounted on the machine frame. The bars are transversely spaced in a horizontal plane and carry two slides 16 which are movable in the direction of elongation of the bars 6, 7. The slides provide support for the base 15 of the mold core which also includes an inflatable hollow last 14 of resilient material. The last is releasably attached to the base 15, and may be moved in and out of the open mold on the slide 16 by means of handle 30. The core part of the mold, when withdrawn from the mold cavity, rests on a work table 31 (FIG. 2) omitted from FIG. 1 for the sake of clarity. The inflating mechanism for the last 14, known in itself, is only partly visible in the drawing, and air valve 29 being shown in FIG. 2.

When mold cores are centered between the movable shaft mold parts 1, 1' and the fixed shaft mold parts 2, 2' by a lazy tong linkage 17 which is pivotally attached to the platens 3, 3' and 4, 4' as best seen in FIG. 5. The links 17 are attached to blocks 47 which are guided in grooves 48 of each slide 16.

The sole or bottom part 21 of each mold is releasably attached to a horizontal heating plate 22 which is fastened to the two upper bars 6. The electrical connections and the resistance wires embedded in the plates 22 have not been shown since they are well known, and the corresponding elements of the platens 3, 3', 4, 4' have also been omitted from the drawing. The mounting elements which connect the sole part 21 to the plate 22 are best seen in FIGS. 3 and 4. Two parallel grooves 25 in an upwardly directed face of the sole part 21 are longitudinally open and are undercut to receive and hold the heads of two bolts 23, 24 whose shanks pass upwardly through bores in the plates 22. The free threaded ends of the bolts above the plate are connected by a bar 26 secured by nuts 26' on te bolts 23, 24. A threaded vertical bore in the center of the bar 26 receives a clamping screw 27 whose head abuttingly engages a bridge member 32 which connects two ribs 22' on the top of the heating plate 22. The screw 27 has a radial handle 28 by means of which the sole part 21 may be quickly fastened to or released from the bars 6. The released sole part 21 may be shifted along the grooves 25 for alignment with the last 14.

An exhaust head 33, shown in FIG. 2 only, protects the press operator.

The afore-described mold press is operated as follows:

A fabric liner carrying a pre-shaped layer of uncured rubber composition is slipped over the last 14 while the latter is deflated and located with its base 15 on the work table 31 as shown in FIG. 2. The last is pushed into position on its slide 16, the sole part 21 is released by means of the handle 28, and the motor 18 is energized to move the bars 6 and bars 7 from the remote position shown in the right-hand part of FIG. 1 toward the near position illustrated at the left of FIG. 1.

During the initial stage of the bar movement, the mold parts 1, 1' move relatively rapidly toward each other and toward the associated mold parts 2, 2'. In the final stage of the mold closing movement, the descending movement of the sole molds 21 is much more rapid than the horizontal movement of the mold parts 1, 1'. The horizontally moving parts abuttingly engage the sole molds 21 and gently move them along the grooves 25 into a position of vertical alignment with the last 14. The slow terminal movement of the shaft mold parts is inherent in the illustrated arrangement and dimensions of the toggle arms 12 whose pivot axes are spaced almost horizontally when the mold is closed. The handle 28 is turned to fasten the sole part 21 to the bars 6 immediately before completion of the closing movement. The valve 29 is opened thereafter to admit compressed air to the lasts 14 and to provide the necessary vulcanization pressure for curing of the rubber composition while the same is being heated by the platens 3, 3', 4, 4', and plates 22. The reversed sequence of steps is performed after vulcanizing to release the finished boot from the press.

When the mold is closed, the shaft mold parts 1, 2 and 1', 2' of each mold abuttingly engage each other, but they also abut from opposite directions against the sole parts 21 and the base 15 of the core part. The precise fit of the shaft mold parts and of the sole part and their alignment with the core part at the moment of engagement and thereafter are essential for precise dimensions of the vulcanizate. Such fit and alignment are provided by the toggle linkage which transmits movement of the horizontal bars 6, 7 to the horizontally movable mold parts, and particularly to the lazy tong arrangement 17 which precisely centers the core part in all stages of operation.

The finished product released from the mold is of uniform shape and dimensions, and free from surface wrinkles.

It should be understood, of course, that the foregoing description relates only to a preferred embodiment of the invention, and that numerous variations and modifications may readily be resorted to by those skilled in the art without departing from the scope and spirit on the attached claim.

What is claimed is:
1. In a shoe molding press, in combination:
 (a) a supporting frame;
 (b) two bar means mounted on said frame for movement toward and away from each other in a predetermined direction;
 (c) actuating means for actuating said movement;
 (d) a multi-part mold including
  (1) two parts jointly constituting a shaft mold and mounted on said frame for movement relative to each other in a direction transverse to said predetermined direction,
  (2) a sole part mounted on one of said bar means and having a face directed outward of said mold and formed with two parallel grooves extending in said transverse direction, and
  (3) a core part mounted on said frame and movable thereon in said transverse direction;
 (e) linkage means hingedly connecting said bar means to one of said two parts of said shaft mold for moving said one part toward the other part of said shaft mold when said bar means move toward each other,
 (f) mounting means connecting said sole part to said one bar means for limited movement in said transverse direction between a plurality of selected positions while preventing movement of said sole part relative to said one bar means in said predetermined direction, said mounting means including
  (1) a heating plate fixedly fastened to said one bar means, said sole part being movable on said heating plate in said transverse direction,
  (2) two elongated threaded members,
  (3) securing means securing respective end portions of said threaded members in said grooves against outward movement in said predetermined direction,
  (4) a bar member superimposed on said heating plate, said bar member and said heating plate being formed with respective pairs of aligned bores, each threaded member passing sequentially through corresponding alinged bores in said heating plate and in said bar member in slidable engagement and having a free end adjacent said bar member,
  (5) a nut on each of said free ends releasably engaging said bar member, said bar member being formed with an internally threaded opening intermediate said bores of the same, and
  (6) a clamping screw threadedly received in said opening, said screw having a free end directed toward said heating plate and moving toward and away from the same when said clamping screw is turned in said opening,
  (7) said threaded members, said securing means, said bar member, said nuts, and said clamping screw jointly constituting releasable means for fixedly fastening said sole part to said heating plate in each of said selected positions.

(References on following page)

References Cited

UNITED STATES PATENTS

| | | | |
|---|---|---|---|
| 1,722,697 | 7/1929 | Glidden et al. | 18—46 X |
| 2,554,552 | 5/1951 | Banovsky | 18—17 |
| 2,907,068 | 10/1959 | Vdolek | 18—17 |
| 3,113,830 | 12/1963 | Boccoli | 18—34 X |
| 2,937,405 | 5/1960 | Berggren et al. | 18—178 X |
| 2,636,233 | 4/1953 | Perkon | 18—30 X |
| 3,158,903 | 12/1964 | Fischer et al. | 18—34 X |

J. HOWARD FLINT, Jr., *Primary Examiner.*